(12) United States Patent
Timmons et al.

(10) Patent No.: US 9,493,090 B2
(45) Date of Patent: Nov. 15, 2016

(54) DYNAMIC BATTERY SYSTEM VOLTAGE CONTROL THROUGH MIXED DYNAMIC SERIES AND PARALLEL CELL CONNECTIONS

(71) Applicants: Adam T Timmons, Birmingham, MI (US); Carrie R Okma, Birmingham, MI (US)

(72) Inventors: Adam T Timmons, Birmingham, MI (US); Carrie R Okma, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 182 days.

(21) Appl. No.: 14/459,995

(22) Filed: Aug. 14, 2014

(65) Prior Publication Data

US 2016/0046200 A1   Feb. 18, 2016

(51) Int. Cl.

| H02P 1/00 | (2006.01) |
| H02P 7/00 | (2016.01) |
| H02P 25/30 | (2006.01) |
| B60L 11/18 | (2006.01) |
| B60L 11/12 | (2006.01) |
| B60L 3/00 | (2006.01) |
| B60L 11/00 | (2006.01) |

(52) U.S. Cl.
CPC .......... *B60L 11/1855* (2013.01); *B60L 3/0046* (2013.01); *B60L 11/007* (2013.01); *B60L 11/123* (2013.01); *B60L 11/1803* (2013.01); *B60L 11/1866* (2013.01); *B60L 11/1877* (2013.01); *Y02T 10/7005* (2013.01); *Y02T 10/7061* (2013.01); *Y10S 903/907* (2013.01)

(58) Field of Classification Search
CPC .. B60L 11/14; B60L 11/123; B60L 2210/40; B60L 2240/423; B60L 7/14; B60L 2220/14; B60L 15/007; B60L 11/1803; B60L 15/20; B60L 11/005; B60L 2210/10; B60L 2240/547; B60L 11/1868; B60L 2240/549; B60L 11/1877; B60L 11/1864; B60L 11/1887
See application file for complete search history.

(56) References Cited

U.S. PATENT DOCUMENTS

| 7,830,117 | B2 | 11/2010 | Ambrosio et al. | |
| 8,330,419 | B2 | 12/2012 | Kim et al. | |
| 8,427,106 | B2 | 4/2013 | Kim et al. | |
| 2003/0106726 | A1* | 6/2003 | Yoshii | B60K 6/26 180/65.1 |
| 2006/0113129 | A1* | 6/2006 | Tabata | B60K 6/365 180/65.25 |
| 2009/0171523 | A1* | 7/2009 | Luo | B60K 6/405 701/22 |
| 2012/0091964 | A1 | 4/2012 | Vance et al. | |

(Continued)

OTHER PUBLICATIONS

International Search Report and Written Opinion dated Oct. 20, 2015 for International Application No. PCT/US2015/044791, International Filing Date Aug. 12, 2015.

*Primary Examiner* — Marlon Fletcher
(74) *Attorney, Agent, or Firm* — Ralph E. Smith

(57) ABSTRACT

An electrified powertrain for a vehicle includes a battery system configured to switch individual battery modules between series, parallel, and bypassed connections, thereby eliminating the need for a DC-DC converter. The battery system is also configured to generate (via a set of drive switches) AC voltages for an electric motor, thereby eliminating the need for an inverter. Control methods for the electrified powertrain, which could be implemented in a controller of the vehicle, include controlling the switches of the battery system to maintain a constant desired output voltage during both discharging and recharging. The control methods also include controlling the series, parallel, and/or bypass switches of the battery system to bypass malfunctioning battery modules and/or to decrease the output voltage of the battery system below a voltage threshold that requires electrical isolation.

16 Claims, 3 Drawing Sheets

(56) References Cited

U.S. PATENT DOCUMENTS

| | | | |
|---|---|---|---|
| 2012/0119573 A1* | 5/2012 | Turudic | B60L 7/14 307/10.1 |
| 2012/0133310 A1 | 5/2012 | Lee | |
| 2013/0103241 A1* | 4/2013 | Koide | B60K 6/365 701/22 |
| 2013/0103242 A1* | 4/2013 | Takeuchi | B60K 6/36 701/22 |
| 2013/0244828 A1* | 9/2013 | Kayano | B60L 3/00 477/7 |
| 2013/0253749 A1* | 9/2013 | Hayashi | B60K 6/445 701/22 |
| 2013/0261865 A1* | 10/2013 | Toki | B60K 6/48 701/22 |
| 2015/0158374 A1* | 6/2015 | Li | B60L 11/12 701/22 |
| 2015/0288313 A1* | 10/2015 | Timmons | H02P 25/22 318/139 |
| 2016/0046200 A1* | 2/2016 | Timmons | B60L 11/1855 318/139 |

\* cited by examiner

DYNAMIC BATTERY SYSTEM VOLTAGE CONTROL THROUGH MIXED DYNAMIC SERIES AND PARALLEL CELL CONNECTIONS

FIELD

The present disclosure relates generally to vehicle battery systems and, more particularly, to techniques for dynamic battery system voltage control through mixed dynamic series and parallel cell connections.

BACKGROUND

Electrified vehicles operate an electric motor to generate drive torque for propulsion. The electric motor receives an alternating current that causes the electric motor to rotatably turn to generate the drive torque. An inverter converts a direct current from a battery system to the alternating current for the electric motor. Due to the power output demands of electric motors in electrified vehicles, the battery system typically has a high voltage, e.g., several hundred Volts. High voltage battery systems typically include a plurality of low voltage battery cells connected in series. As a result of this series configuration, however, voltage imbalance occurs across the various battery cells, which causes decreased vehicle efficiency and/or decreased vehicle responsiveness. In addition, when one battery cell in the series malfunctions, the entire battery system typically malfunctions. Further, these high voltage vehicle electrical systems also require electrical isolation of the high voltage positive and negative potentials from the electrified vehicle's chassis, which increases costs and/or system complexity. Thus, there remains a need for improvement in the relevant art of high power electrified powertrains for electrified vehicles.

SUMMARY

In one aspect, an electrified powertrain for a vehicle is provided in accordance with the teachings of the present disclosure. In an exemplary implementation, the electrified powertrain includes an electric motor comprising at least one coil and a rotor and a battery system configured to output a high voltage, the battery system comprising a plurality of battery modules. Each battery module comprises a battery cell configured to generate a low voltage, at least one series switch configured to connect the battery cell in series with at least one neighboring battery module, a parallel switch configured to connect the battery cell in parallel with at least one neighboring battery module, and a bypass switch configured to bypass the battery cell. The electrified powertrain includes a motor drive module comprising a set of drive switches configured to provide an alternating current to each coil thereby causing the rotor of the electric motor to rotatably turn and generate drive torque. The electrified powertrain also includes a controller configured to (i) control the switches of the battery modules to maintain the high voltage of the battery system at a desired voltage, and (ii) control the motor drive module to generate a desired alternating current for each coil of the electric motor.

In one exemplary aspect, the controller is configured to control a switching sequence of the switches of the battery modules to maintain voltage balancing across the battery modules during both discharging of the battery system and recharging of the battery system. The controller is also configured to control the switches of the battery modules to identify one or more malfunctioning battery modules. In one exemplary implementation, the controller is configured to control the switches of the battery modules to bypass any identified malfunctioning battery modules.

In one exemplary aspect, the controller is configured to control the switches of the battery modules to connect at least some of the battery modules in parallel to decrease the high voltage of the battery system below a low threshold voltage. In one exemplary implementation, this low threshold voltage is a voltage that does not require electrical isolation.

In one exemplary aspect, the controller is configured to control the switches of the battery system to maintain the high voltage at the desired voltage during both discharging of the battery system and recharging of the battery system. In one exemplary implementation, the desired voltage for discharging the battery system is (i) based on a torque request or (ii) based on optimizing operation of the electric motor.

In one exemplary aspect, the electrified powertrain is configured to generate the drive torque to propel the electrified vehicle without using a direct current (DC) to DC converter. The electrified powertrain is also configured to generate the drive torque to propel the electrified vehicle without using an inverter. In some exemplary implementations, the drive switches are insulated gate bipolar transistors (IGBTs).

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
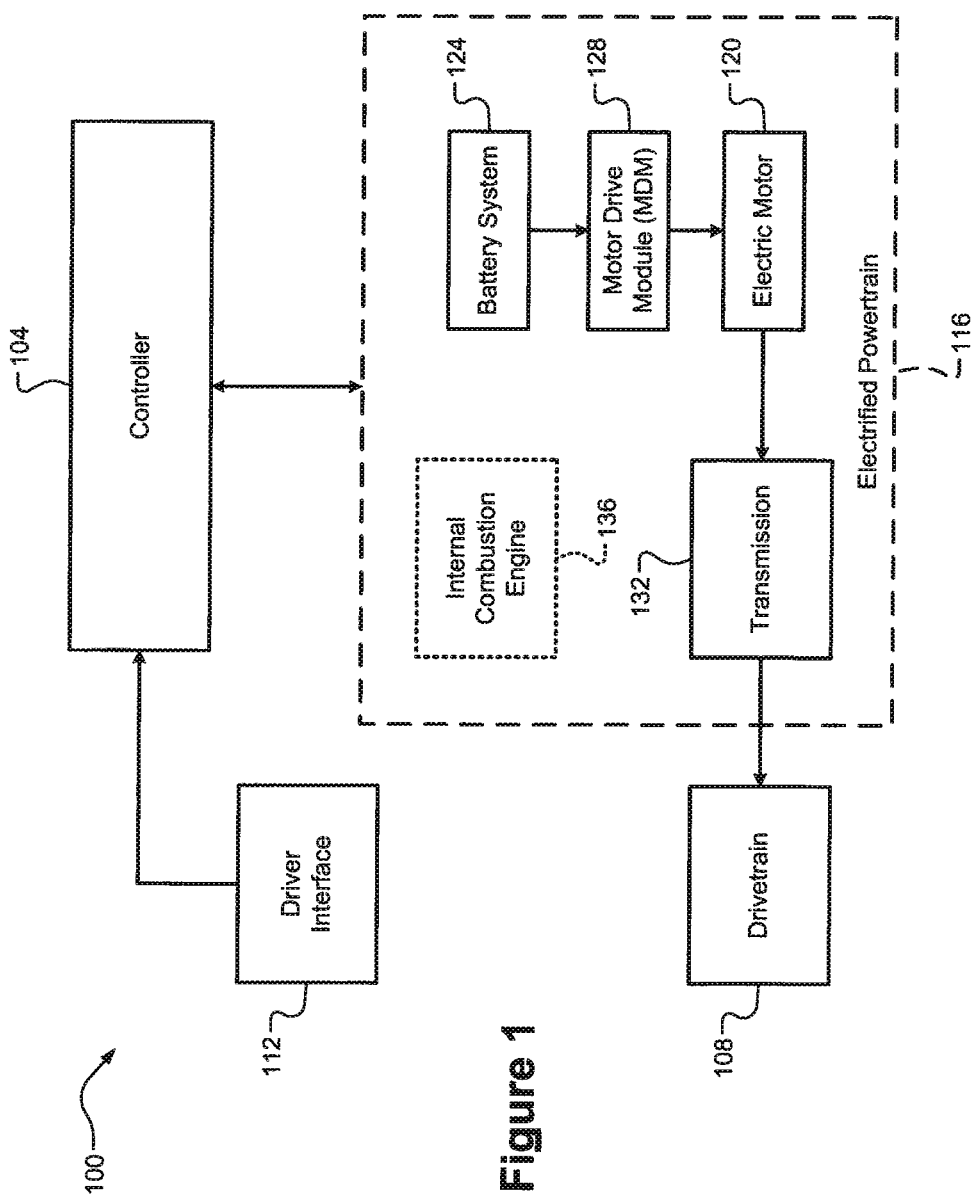
FIG. 1 is an example functional block diagram of a vehicle according to the principles of the present disclosure.

As previously mentioned, typical battery systems include a plurality of low voltage battery cells connected in series to achieve a high voltage for powering an electric motor. As a result of this series configuration, however, voltage imbalance occurs across the various battery cells, which can cause decreased vehicle efficiency and/or decreased vehicle responsiveness. This high voltage output by the battery system is a direct current (DC) voltage, and thus a DC-DC converter could be required to step-up or "boost" high output voltage to a desired level. An inverter is also required to convert the DC voltage to alternating current (AC) voltages for the electric motor. Also as a result of this series configuration, when one battery cell in the series malfunctions, the battery system itself malfunctions, which could render the electrified vehicle inoperable.

Furthermore, because the battery system generates the high output voltage, electrical isolation is required. More particularly, any DC voltage greater than a specific voltage threshold requires electrical isolation and any DC or AC voltage greater than specific voltage thresholds require electrical isolation detection and systems to detect if there has been an exposure of high voltage. For example, these voltage thresholds could be defined by government regulations. As one of ordinary skill in the art will readily appreciate, electrical isolation involves implementing additional contactors and control circuitry, as well as sensor circuitry for detecting and verifying the electrical isolation and the exposure of high voltage. This increases costs and/or complexity of the electrical system for an electrified vehicle.

Accordingly, a dynamic electrified powertrain for a vehicle and corresponding control methods are presented. The dynamic electrified powertrain provides for a fully dynamic battery system configured to switch individual battery modules between series, parallel, and bypassed connections. The battery system, therefore, eliminates the need for a DC-DC converter to alter the battery system's voltage for use by a motor driving propulsion inverter (capacitive, inductive, etc.). Further, the battery system is configured to generate (via a set of drive capacitors and drive switches) AC voltages for an electric motor, thereby eliminating the need for an inverter. Eliminating the DC-DC converter and the inverter decreases costs and complexity.

The control methods (e.g., implemented by a controller of the electrified vehicle) include controlling the switches of the battery system to maintain a constant desired output voltage during both discharging (e.g., vehicle acceleration) and recharging. In some implementations, the control methods include controlling the switches of the battery system to bypass malfunctioning battery modules and/or to decrease the output voltage of the battery system (e.g., during vehicle off periods) below a voltage threshold that requires electrical isolation. In yet other implementations, the control methods include controlling the switches of the battery system to control recharging at a lower voltage (more efficient) and to control discharging at a higher voltage (more responsive).

Referring now to FIG. 1, a functional block diagram of an electrified vehicle 100 is illustrated. Examples of the electrified vehicle 100 include a battery electric vehicle (BEV), a range-extended electric vehicle (REEV), and a hybrid electric vehicle (HEV), such as a plug-in HEV (PHEV) and a non-plug-in HEV. The electrified vehicle 100 could also be another suitable electrified vehicle. The EV 100 includes a controller 104 that controls operation of the electrified vehicle 100. Specifically, the controller 104 controls drive torque supplied to a drivetrain 108 (one or more wheels, a differential, etc.) in response to a torque request via a driver interface 112. The driver interface 112 is one or more devices configured to allow a driver of the electrified vehicle 100 to input a vehicle torque request, e.g., an accelerator pedal. The drive torque is supplied to the drivetrain 108 from an electrified powertrain 116.

The electrified powertrain 116 is a high power electrified powertrain capable of generating enough drive torque to propel the electrified vehicle 100. In one exemplary implementation, the electrified powertrain 116 for a BEV includes an electric motor 120, a battery system 124, a motor drive module (MDM) 128, and a transmission 132. The transmission 132 transfers drive torque generated by the electric motor 120 to the drivetrain 108. Examples of the electric motor 120 are synchronous electric motors and asynchronous electric motors of the types including, but not limited to, permanent magnet, switched reluctances, and induction. In some implementations (REEV, HEV, etc.), the electrified powertrain 116 could optionally include an internal combustion engine 136. The internal combustion engine 136 combusts a mixture of air and fuel, e.g., gasoline, within cylinders to rotatably drive a crankshaft and generate drive torque. In one implementation, the internal combustion engine 136 is coupled to an electrically variable transmission (EVT) 132 utilizing two electric motors 120 and is utilized to both provide motive power and recharge the battery system 124, e.g., during driving of the electrified vehicle 100.

Figure 2:
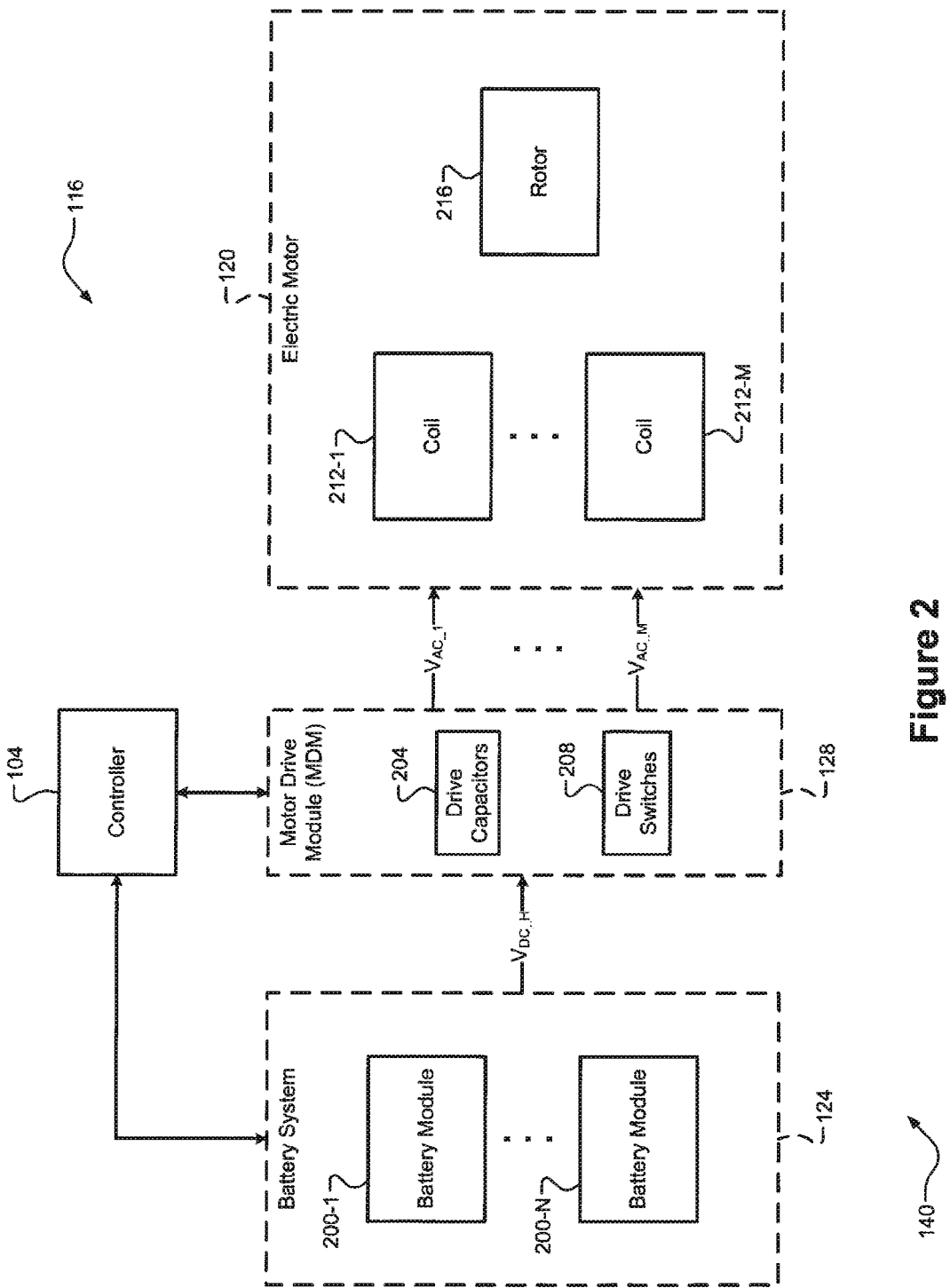
FIG. 2 is an example functional block diagram of an electrified powertrain of the vehicle according to the principles of the present disclosure.

Referring now to FIG. 2, an example functional block diagram of the electrified powertrain 116 is illustrated. The battery system 124 and the MDM 128 are collectively referred to as an electrical system 140. The electric motor 120 may also be described as being part of the electrical system 140. The battery system 124 includes N battery modules 200-1 . . . 200-N (N>1, collectively "battery modules 200") each configured to generate a low DC voltage. In one example implementation, each battery module 200 is configured to generate approximately four Volts at full charge and approximately three Volts at full discharge. The battery system 124 is configured to generate and output a high DC voltage ($V_{DC\_H}$) based on some combination of the low DC voltages generated by the battery modules 200. In some implementations, however, some or all of the battery modules 200 may be connected in parallel with each other and thus the high voltage $V_{DC\_H}$ may be approximately equal to the low voltage.

The MOM 128 receives the high DC voltage $V_{DC\_H}$ from the battery system 124. In one implementation, the MDM 128 includes a set of capacitors 204 and a set of drive switches 208. Each capacitor of the set of drive capacitors 204 is any suitable capacitor configured to store electrical energy corresponding to at least a portion of the high DC voltage $V_{DC\_H}$. Each switch of the set of drive switches 208 is configured to connect one or more capacitors of the set of drive capacitors 204 to the electric motor 120. It will be appreciated, however, that the MDM 128 could only include the drive switches 208 and not the set of capacitors 204, such as when an inverter-type DC-DC conversion is implemented. In one exemplary implementation, the electrified powertrain 116 could further include a DC-DC step-down auxiliary power module (APM) that is configured to charge a 12 Volt battery of the electrified vehicle 100 in lieu of an alternator.

In one exemplary implementation, the set of drive switches 208 include insulated gate bipolar (IGBT) switches. More specifically, the set of drive switches 208 are configured to obtain M AC voltages $V_{AC\_1}$ . . . $V_{AC\_M}$ (collectively $V_{AC}$) from the high DC voltage $V_{DC\_H}$. These AC voltages $V_{AC}$ are supplied to M coils 212-1 . . . 212-M (M>0, collectively "coils 212") of the electric motor 120. The action of the drive switches 208 cause currents to flow through the respective coils 212, which generates magnetic fields. These magnetic fields cause a rotor 216 of the electric motor 120 to rotatably turn, thereby generating the drive torque. The drive torque is then transferred to the drivetrain 112, e.g., via the transmission 132, to propel the electrified vehicle 100.

Figure 3:
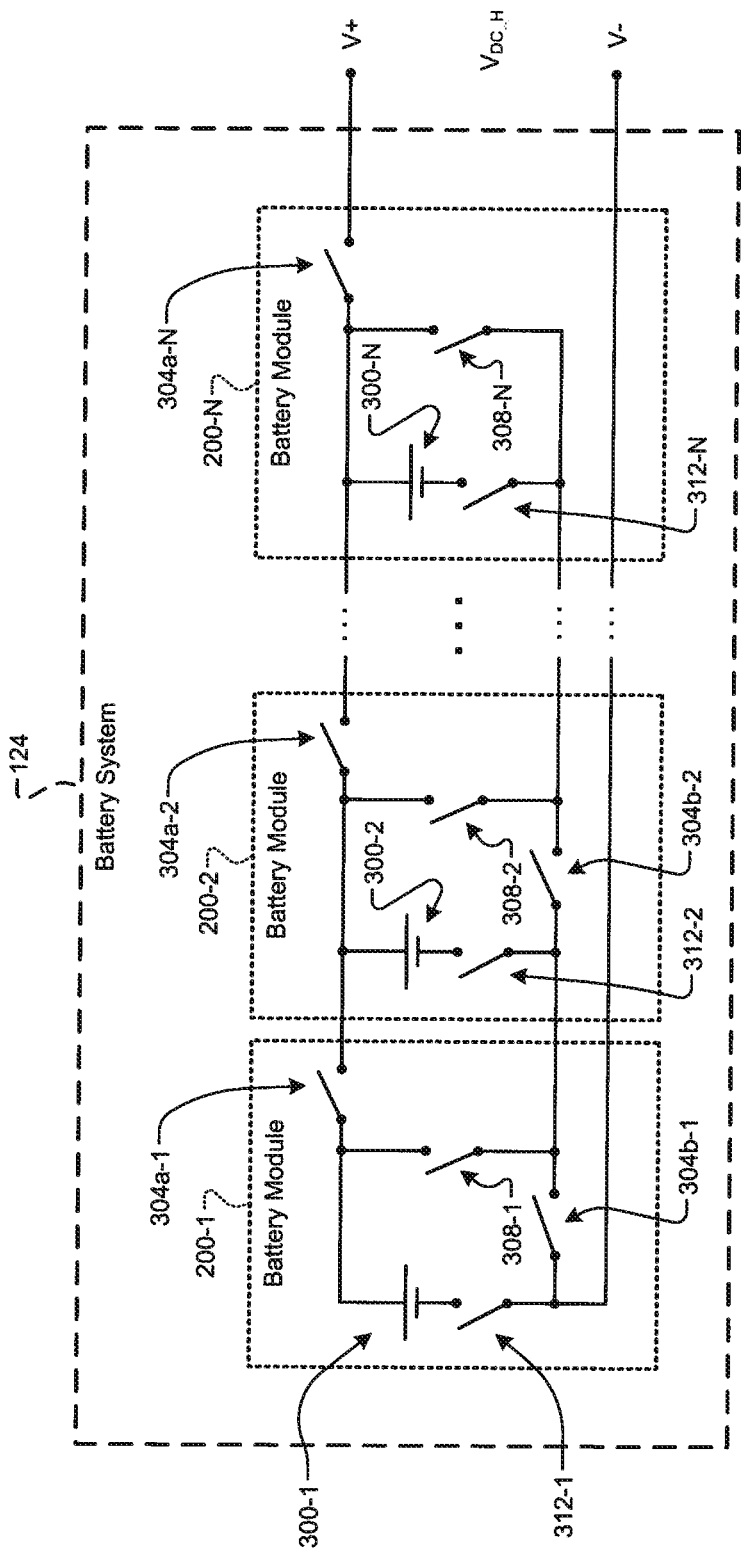
FIG. 3 is an example circuit diagram of a battery system of the electrified powertrain according to the principles of the present disclosure.

Referring now to FIG. 3, an example circuit diagram of the battery system 124 is illustrated. The battery system 124 includes the N battery modules 200. While each battery module 200 is shown as having individual sets of components as described below, it will be appreciated that each battery module 200 could include sets of components, such as multiple battery cells and/or multiple series/parallel switches. In such a configuration, there could be also existing connectivity between these sets of components, such as parallel switches. One example implementation of a specific battery module 200 having six sets of components is discussed in greater detail below.

As illustrated, the battery system 124 further includes battery cells 300-1 . . . 300-N (collectively "battery cells 300"), series switches 304a-1 . . . 304a-N and 304b-1 . . . 304b-K (K=N−1, collectively "series switches 304"), and parallel switches 308-1 . . . 308-N (collectively "parallel switches 308"). Examples of the series and parallel switches 304, 308 include field-effect transistors (FETs) and IGBTs. The series switches are also divided into positive series switches 304a-1 . . . 304a-N (collectively "positive series switches 304") and negative series switches 304b-1 . . . 304b-K (collectively "negative series switches"). It should be noted that the last battery module 200-N does not include one of the negative series switches 304 because it is the last in the series. The battery system 124 also includes bypass switches 312-1 . . . 312-N (collectively "bypass switches 312"). The series, parallel, and bypass switches 304, 308, and 312, respectively, are also referred to collectively herein as the switches of the battery system 124.

Based on a configuration of the switches 304, 308, and 312, the battery system 124 is configured to generate the high DC voltage $V_{DC\_H}$ ranging from zero Volts to a maximum voltage of the battery system 124 (e.g., a full series configuration). As shown, the left-most battery cell 300-1 is tied to a negative voltage output (V−) and the right-most battery cell 300-N is tied to a positive voltage output (V+). To put the left-most battery cell in parallel with the next battery cell 300-2, series switches 304a-1 and 304b-1 are closed and parallel switch 308-1 is opened. In contrast, for a series configuration, parallel switch 308-1 is closed while series switches 304a-1 and 304b-1 are opened.

To bypass the left-most battery cell 300-1 (e.g., due to a malfunction) while in a series or parallel configuration, series switch 304a-1 and parallel switch 308-1 are opened while series switch 304b-2 is closed. To bypass the second battery cell 300-2 while in a series configuration, series switches 304a-1, 304a-2, 304b-1, and 304b-2 and parallel switch 308-2 are opened while parallel switch 308-1 is closed. To bypass the second battery cell 300-2 while in a parallel configuration, series switches 304a-1, 304a-2, 304b-1, and 304b-2 are closed while parallel switches 308-1 and 308-2 are opened.

For explanatory purposes only, the battery system 124 could include six battery modules 200 (N=6) each configured to output a low DC voltage of approximately four Volts DC. For example only, each battery cell may be a lithium ion (Li-ion) battery cell. In order to achieve voltage balancing across the battery cells 300, possible configurations could include 1 series/5 parallel (4 Volts), 2 series/3 parallel (8 Volts), 3 series/2 parallel (12 Volts), and 5 series/1 parallel (24 Volts) in order to permit 4 Volt steps. This same concept could be applied to a larger battery system 124, such as a battery system having 96 battery modules 200 (or alternatively, 96 battery cells 300 across fewer battery modules 200). Switching between these various configurations could then be performed to achieve voltage balancing across the battery cells 300.

Referring again to FIG. 2 and with continued reference to FIG. 3, the controller 104 is configured to control the switches 304, 308, and 312 to maintain the high DC voltage $V_{DC\_H}$ at a desired voltage. This desired voltage is constant and, in some implementations, is based on vehicle operating parameters (e.g., the vehicle torque request) and/or operating parameters of the battery system 124 (state of charge (SOC), state of health (SOH), state of power (SOP), etc.). For example, the desired voltage for discharging could be based on the vehicle torque request and/or motor operation optimization, whereas the desired voltage for recharging could be based on the operating parameters of the battery system 124. The controller 104 is also configured to perform voltage balancing across the battery modules 200 (the battery cells 300) during discharging of the battery system 124, recharging of the battery system 124, and during times when the battery system 124 is online but is not providing discharge power or accepting charge. In one exemplary implementation, the controller 104 is configured to charge the battery system 124 at a lower voltage and discharge the battery system 124 at a higher voltage. For example, the controller 104 could adjust a switching sequence of the switches 304, 308, and 312 to achieve this voltage balancing.

In one exemplary implementation, the controller 104 is configured to detect malfunctioning battery modules 200. For example, the controller 104 could adjust the switches 304, 308, and 312 and subsequently measure values (e.g., voltages) to detect malfunctioning battery modules 200. In response to detecting malfunctioning battery modules 200, the controller 104 could control the switches 304, 308, and 312 to bypass the malfunctioning battery modules 200 (i.e., malfunctioning battery cells 300), thereby allowing the electrified powertrain 116 (and thus the electrified vehicle 100) to continue operation. In another exemplary implementation, the controller 104 is configured to control the switches 304, 308, and 312 to decrease the output voltage of the battery system 124 below a predetermined voltage threshold that requires electrical isolation. For example only, the predetermined voltage threshold may be 60 Volts DC. The controller 104 could command this voltage drop in response to a vehicle-off event (i.e., when the electrified vehicle 100 is turned off), thereby allowing for maintenance on the electrified powertrain 116 without electrical isolation.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electrified powertrain for a vehicle, comprising:
   an electric motor comprising at least one coil and a rotor;
   a battery system configured to output a high voltage, the battery system comprising a plurality of battery modules, each battery module comprising:
   a battery cell configured to generate a low voltage,
   at least one series switch configured to connect the battery cell in series with at least one neighboring battery module,
   a parallel switch configured to connect the battery cell in parallel with at least one neighboring battery module, and
   a bypass switch configured to bypass the battery cell;
   a motor drive module comprising a set of drive switches configured to provide an alternating current to each coil thereby causing the rotor of the electric motor to rotatably turn and generate drive torque; and a controller configured to:
(i) control the switches of the battery modules to maintain the high voltage of the battery system at a desired voltage, and
(ii) control the motor drive module to generate a desired alternating current for each coil of the electric motor.

2. The electrified powertrain of claim 1, wherein the controller is configured to control a switching sequence of the switches of the battery modules to maintain voltage balancing across the battery modules during both discharging of the battery system and recharging of the battery system.

3. The electrified powertrain of claim 1, wherein the controller is configured to control the switches of the battery modules to identify one or more malfunctioning battery modules.

4. The electrified powertrain of claim 3, wherein the controller is configured to control the switches of the battery modules to bypass any identified malfunctioning battery modules.

5. The electrified powertrain of claim 1, wherein the controller is configured to control the switches of the battery modules to connect at least some of the battery modules in parallel to decrease the high voltage of the battery system below a low threshold voltage.

6. The electrified powertrain of claim 5, wherein the low threshold voltage is a voltage that does not require electrical isolation.

7. The electrified powertrain of claim 1, wherein the controller is configured to control the switches of the battery system to maintain the high voltage at the desired voltage during both discharging of the battery system and recharging of the battery system.

8. The electrified powertrain of claim 7, wherein the desired voltage for recharging the battery system is based on one or more operating parameters of the battery system.

9. The electrified powertrain of claim 7, wherein the desired voltage for discharging the battery system is (i) based on a torque request or (ii) for optimizing operation of the electric motor.

10. The electrified powertrain of claim 1, wherein the electrified powertrain is configured to generate the drive torque to propel the vehicle without using a direct current (DC) to DC converter.

11. The electrified powertrain of claim 1, wherein the electrified powertrain is configured to generate the drive torque to propel the vehicle without using an inverter.

12. The electrified powertrain of claim 1, wherein the drive switches are insulated gate bipolar transistors (IGBTs).

13. The electrified powertrain of claim 1, wherein the switches are low voltage, high current switches.

14. The electrified powertrain of claim 1, further comprising a transmission configured to transfer drive the drive torque generated by the electric motor to a drivetrain of the vehicle.

15. The electrified powertrain of claim 1, wherein:
the plurality of battery modules comprises N battery modules, N being an integer greater than one;
(N−1) first battery modules each comprise four switches; and
a last battery module comprises three switches.

16. The electrified powertrain of claim 1, wherein:
the plurality of battery modules comprises N modules, N being an integer greater than one;
(N−1) first battery modules each comprise two series switches configured to connect its battery cell in series with at least one neighboring battery module, the two series switches comprising a positive series switch and a negative series switch; and
a last battery module comprises one series switch configured to connect its battery cell in series with its one neighboring battery module, the one series switch being a positive series switch.

* * * * *